3,748,242
PREPARATION OF CYCLOBUTANONES FROM
GLUTARIC ANHYDRIDES
Hiroyuki Hiraoka, Los Gatos, Calif., assignor to International Business Machines Corporation, Armonk, N.Y.
No Drawing. Filed June 12, 1972, Ser. No. 261,879
Int. Cl. B01j 1/10
U.S. Cl. 204—158 R      8 Claims

ABSTRACT OF THE DISCLOSURE

The preparation of cyclobutanones from glutaric anhydrides by means of photolysis at a temperature of from about 120 to about 300° C.

FIELD OF THE INVENTION

The present invention is concerned with the synthesis of cyclobutanones. The synthesis is accomplished by the photolysis of glutaric anhyrides at a temperature of from about 120 to about 300° C.

PRIOR ART

Cyclobutanones have previously been prepared by cyclo-addition of an olefin and an unstable ketene, or the cyclo-addition of an olefin and an allene followed by oxidation. Such syntheses are much more difficult than the process of the present invention.

Glutaric anhydrides have been subjected to photolysis in the past as shown by the publication of Krull and Arnold in Tetrahedron Letters 4349 (1969). That prior publication, however, was carried out at a temperature very much below that of the present invention and did not yield the desirable results of the present invention.

SUMMARY OF THE INVENTION

According to the process of the present invention, glutaric anhydrides at a temperature of about 120 to about 300° C. are subjected to illumination with light. The overall equation for the reaction is as follows:

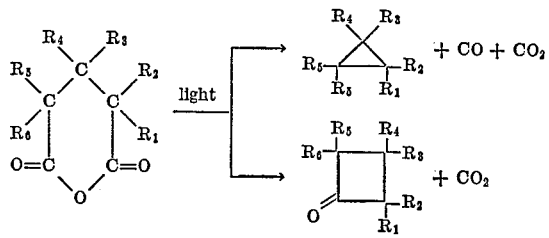

wherein each of $R_1$, $R_2$, $R_3$, $R_4$, $R_5$ and $R_6$ is either hydrogen or an aliphatic hydrocarbon group.

The yield in the above equation is almost quantitative with nearly equal amounts of a cyclobutanone and a cyclopropane being formed with combined quantum yield close to unity. There is no polymer film formation on the wall of a quartz reactor for low conversion and common low pressure mercury lamps are the preferred source of illumination.

The process of the present invention may be employed as a batch system or a flow system with or without a carrier gas. The temperature should be within the range of about 120 to about 300° C. It is believed that the high vapor pressure stabilized as intermediate species to form a cyclobutanone. It is preferred that the reaction take place in the vapor state, and that the partial pressure of the glutaric anhydride be greater than 1 torr and preferably more than about 10 torr.

As mentioned previously an ordinary low pressure mercury lamp is an extremely desirable source of illumination. It is believed that such illumination is particularly effective since it is close in wave length to the absorption peak of glutaric anhydrides at 2230 A. units. The process can be carried out with or without a trace of mercury, which can be added to increase the efficiency of light utilization.

Cyclobutanones are useful as chemical intermediates. For example, a cyclobutanone is a starting material in the preparation of polymers having cyclobutanone rings in their main chain as reported in the Journal of American Chemical Society, vol. 93, p. 121 (1971). Cyclobutanone itself is potentially very important in chemical industry since its oxime can be easily rearranged to alpha-pyrrolidone, a monomer of 4-nylon.

In carrying out the process of the present invention, any temperautre within the range of about 120—about 300° C. may be employed. It is, however, preferable to use temperatures in the range of about 200-230° C. It is also preferred that the partial pressure of the glutaric anhydride starting material be from 10 to 20 torr.

The following examples are given solely for purposes of illustration and are not to be considered limitations on the invention, many variations of which are possible without departing from the spirit or scope thereof.

EXAMPLE I

Glutaric anhydride, 2 g., was placed with a drop of mercury in a 800 ml. cylindrical quartz tube. After the cylinder was pumped down to $10^{-3}$ torr, it was placed inside a quartz tubing heated with nickrom wire for a half hour before irradiation to get temperature equilibrium. Then, the entire set-up of the quartz tubings were irradiated by a bank of low pressure mercury lamps surroundthem for several minutes. After irradiation, the products were pumped out through a liquid nitrogen trap, while measuring the amount of CO formed. The rest of the products, carbon dioxide, cyclopropane and cyclobutanone, were analyzed with gas chromatograph. The isolated products were identified in comparison with commercially available authentic samples in regard to their IR, mass, and NMR spectra. As very minor products, traces of ethylene and gamma-butyrolactone were identified. The light intensity was measured with 3-pentanone, and also with a mixture of nitrous oxide and ethane: both yielded the same results, $9.6 \times 10^{-5}$ Einstein/minute. For 10 minutes irradiation, the results are shown in the following:

Products, $10^{-4}$ moles / 10 min:

| Temperature, ° C. | Carbon monoxide | Cyclopropane | Cyclobutanone |
|---|---|---|---|
| 260 | 3.67 | 3.11 | 2.76 |
| 220 | 3.91 | 3.37 | 2.60 |
| 155 | 4.37 | 4.30 | 0.59 |

EXAMPLE II

Glutaric anhydride, 1 g., was placed in a 300 ml. quartz tube with flat quartz windows on both sides. After the tube was pumped down to $10^{-3}$ torr, it was placed inside a furnace, and heated to 200° C. After temperature equilibrium was established, the sample was irradiated through both quartz windows with medium pressure mercury lamps for 8 hours. The gas chromatographic separation of the photolyzate yielded cyclobutanone 0.074 g. (yield 24%), cyclopropane 0.070 g. (yield 38%), with 0.50 g. of glutaric anhydride recovered. Small amounts of acetic acid and n-butylic acid were also formed. This example showed that the presence of mercury in Example I was not a necessity, but increased the efficiency of light utilization by the sensitization with low pressure mercury lamps.

EXAMPLE III 2,2'-dimethylglutaric anhydride, 1 g., was placed in an 800 ml. cylindrical quartz tube with a drop of mercury, and the experiment was carried out exactly in the same way as in Example I at 165° C. After 20.0 min. irradiation, $1.9 \times 10^{-3}$ Einstein, 2,2'-dimethylcyclobutanone 0.029 g. (yield 35%), 1,1'-dimethylcyclopropane 0.040 g. (yield 65%), carbon dioxide, and carbon monoxide were obtained as major products with the unreacted 2,2'-dimethylglutaric anhydride 0.88 g. recovered. A small amount of isobytylene was also obtained. Total quantum yield for the cyclobutanone and the cyclopropane was 0.46. Exactly in the same way, 3,3'-dimethylglutaric anhydride yielded 3,3'-dimethylcyclobutanone 0.010 g. (yield 11%), 1,1'-dimethylcyclopropane 0.042 g. (yield 67%), with 3,3'-dimethylglutaric anhydride 0.87 g. recovered. This example showed 2,2'-dimethylcyclobutanone can be prepared more effectively than 3,3'-dimethylcyclobutanone, while a conventional method with a ketene yields a mixture of both isomers.

EXAMPLE IV 3,3'-tetramethyleneglutaric anhydride, 1 g, was placed in an 800 ml. quartz cylindrical tube with a drop of mercury, and the experiment was carried out exactly in the same way as in Example I at 235° C. After 20.0 min. irradiation, 3,3' - tetramethylenecyclobutanone 0.020 g. (yield 21%), spiro [2,4] heptane 0.048 g. (yield 65%), carbon dioxide, and carbon monoxide were obtained as major products with the unreacted tetramethyleneglutaric anhydride 0.87 g. recovered. 3,3'-tetramethylenecyclobutanone, a new compound, has been identified from the following spectroscopic data: infra-red absorptions in carbon tetrachloride (2950, 2910, 2860, 1778 (C=O), 1450, 1386 cm.$^{-1}$); NMR absorptions in carbon tetrachloride ($\tau$ 7.20(s., 4), 8.28(m., 8)); mass spectrum (mol. wt. 168). This example showed that a rather complicated bicyclic cyclobutanone can be prepared easily by this invention.

What is claimed is:
1. A process for the preparation of a compound having the formula

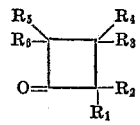

wherein each of $R_1$, $R_2$, $R_3$, $R_4$, $R_5$ and $R_6$ is either hydrogen or an aliphatic hydrocarbon group, said process comprising subjecting a compound having the formula

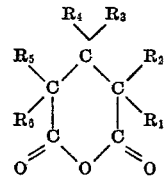

wherein each of $R_1$, $R_2$, $R_3$, $R_4$, $R_5$ and $R_6$ is either hydrogen or an aliphatic hydrocarbon group to illumination with light at a temperature of from about 120 to about 300° C.

2. A process as claimed in claim 1 wherein the illumination is carried out at a temperature of from 200 to 230° C.

3. A process as claimed in claim 1 wherein the partial vapor pressure of the glutaric anhyride is at least 1 torr.

4. A process as claimed in claim 1 wherein the illumination is carried out by means of a low pressure mercury lamp.

5. A process for preparing cyclobutanone by subjecting glutaric anhydride to illumination with light at a temperature of from about 120 to about 300° C.

6. A process as claimed in claim 5 wherein the illumination is carried out at a temperature of from 200 to 230° C.

7. A process as claimed in claim 5 wherein the partial vapor pressure of the glutaric anhydride is at least 1 torr.

8. A process as claimed in claim 5 where the illumination is carried out by means of a low pressure mercury lamp.

References Cited

Krull et al., Tetrahedron Letters (1969), pp. 4349–51.

HOWARD S. WILLIAMS, Primary Examiner